United States Patent [19]

Bader et al.

[11] Patent Number: 5,858,552
[45] Date of Patent: Jan. 12, 1999

[54] FILM STRUCTURE

[75] Inventors: Michael J. Bader; Susan S. Crane, both of Fairport; James A. Johnson, Jr., Canandaigua; Francis D. Tran, Fairport, all of N.Y.

[73] Assignee: Mobil Oil Corporation, Fairfax, Va.

[21] Appl. No.: 846,188

[22] Filed: Apr. 28, 1997

Related U.S. Application Data

[63] Continuation-in-part of Ser. No. 616,547, Mar. 15, 1996, abandoned.

[51] Int. Cl.⁶ ..................................................... B32B 27/08
[52] U.S. Cl. .......................... 428/516; 428/447; 428/500; 428/515
[58] Field of Search ..................................... 428/447, 500, 428/515, 516, 523

[56] References Cited

U.S. PATENT DOCUMENTS

| | | | |
|---|---|---|---|
| 4,230,767 | 10/1980 | Isaka et al. .............................. | 428/349 |
| 4,419,411 | 12/1983 | Park ......................................... | 428/516 |
| 4,725,466 | 2/1988 | Crass et al. ............................... | 428/35 |

*Primary Examiner*—Helen L. Pezzuto
*Attorney, Agent, or Firm*—Jessica M. Sinnott

[57] ABSTRACT

A film structure comprises a first outer skin layer (a) of an olefin co- or terpolymer having an external surface which is sealable and machinable, the first skin layer containing a non-migratory particulate crosslinked hydrocarbyl substituted polysiloxane, and which is located on one side of a core olefinic polymer layer (b) on an opposite side of the core layer there is a second skin layer (c) which is ethylene homopolymer and which is free of the particulate crosslinked hydrocarbyl-substituted polysiloxane of the first skin layer, the second skin layer. In one embodiment, for improved barrier properties, the ratio of particle size to thickness of the (a) skin layer ranges from about 1.25 to about 2.5.

6 Claims, No Drawings

FILM STRUCTURE

CROSS-REFERENCE TO RELATED APPLICATIONS

This patent application is a continuation-in-part of application U.S. Ser. No. 08/616,547 filed on Mar. 15, 1996, now abandoned.

FIELD OF THE INVENTION

This invention relates to the field of polymer films. It more particularly relates to a sealable biaxially oriented composite film structure in which the sealable skin layer contains particulate crosslinked hydrocarbyl substituted polysiloxane.

BACKGROUND OF THE INVENTION

In the packaging of certain types of foods, such as snack foods including candies, potato chips, cookies and the like, it is common practice to employ a multi-layer film. Polypropylene films are widely used in the packaging industry due to their superior physical properties, such as, transparency, stiffness, moisture barrier characteristics and others. Despite these highly desirable properties, unmodified polypropylene film has the disadvantageous property of having a high inherent coefficient of friction and film-to-film destructive blocking on storage. This high film-to-film coefficient of friction makes polypropylene films difficult to be successfully employed in automatic packaging equipment in their unmodified form.

Coefficient of friction characteristics of polypropylene and other thermoplastic films are beneficially modified by the inclusion in the polymer of slip agents. Most of these slip agents are migratory, such as polydiallyl siloxane or fatty amides, such as, erucamide and oleamide. Although they do reduce the coefficient of friction, their effectiveness depends upon the ability to migrate to the surface of the film. The development of the desired low coefficient of friction value is strongly dependent upon the type and amounts of amides, and time and temperature aging effects. Even the heat history of the film while in storage and shipping and during subsequent converter processes, significantly affects the coefficient of friction. In addition, the presence of these types of fatty acid amides on the film surface results in visible adverse appearance effects, manifested by an increase in haze, a decrease in gloss and the presence of streaks. These materials also adversely effect the wettability and adhesion of solvent and water-based inks, coatings and adhesives.

To overcome the problems associated with migratory slip agents, non-migratory systems were developed. A material described to be a non-migratory slip agent is a particulate crosslinked hydrocarbyl-substituted polysiloxane which is available worldwide from Toshiba Silicone Co., Ltd. and in the United States from General Electric Co. And marketed under the name TOSPEARL.

In PCT US94/14280 a film structure containing a non-migratory particulate crosslinked hydrocarbyl-substituted polysiloxane slip agent is described. The film structure includes at least one layer of an olefin homo-, co- or terpolymer having a surface-treated external surface which is printable, sealable and machinable and as combined slip agent and antiblock a non-migratory particulate crosslinked hydrocarbyl-substituted polysiloxane, and/or liquid polydimethyl siloxane. Example 7 provides a polypropylene core layer having (a) an outer skin layer of high density polyethylene containing particulate crosslinked polymonoalkylsiloxane as non-migratory combined antiblock and slip agent and low density polyethylene. On the other side of the core layer is (c) an outer layer resin which also contains the non-migratory combined antiblock and slip agent. The film is flame treated on one side to improve the wettability and printability and lamination strengths. The size of the particulate in terms of average diameter is about 4.5$\mu$ and the target skin thickness of the (a) layer is three gauge units and four gauge units for the (c) layer so the ratio of particle size in terms of average diameter to skin thickness is about 5.9 for the three gauge skin layer and about 4.42 for the four gauge skin layer. The film is described as having good coefficient of friction, on the treated side, and marginal machinability.

Additional descriptions of olefinic polymer films in which particulate siloxane resins are employed to provide improved films will be found in U.S. Pat. Nos. 4,966,933; 4,769,418; 4,652,618; and 4,594,134.

U.S. Pat. No. 4,966,933 describes a propylene polymer film containing 100 parts by weight of a propylene polymer, 0.01 to 0.5 parts by weight of a fine powder of a crosslinked silicone resin and 0.3 to 3.0 parts by weight of a hydroxy-fatty acid glyceride. In column 3, lines 6–20, the provided amounts of fine powder of silicone resin and hydroxy-fatty acid glyceride in the metallization layer are required for adaptability to vacuum deposition. Example 3 provides a two-layer coextruded film in which the fine powder of crosslinked silicone resin is compounded with polypropylene homopolymer to form a metallization layer (B) and the fine powder of crosslinked silicone resin is compounded with an ethylene/propylene/butene-1 copolymer to form a skin layer (a). The ratio of reported particle size to skin thickness is about 0.143 for skin layer (B) and about 1.29 for skin layer (A).

SUMMARY OF THE INVENTION

This invention provides a film which has low coefficient of friction, for good machinability, good heat sealability, low haze, good gloss (of unmetallized film), nonblocking properties, reduced appearance defects and good to excellent barrier properties.

More specifically, the invention provides a film structure which includes an olefinic polymer core layer having at least one skin layer comprising an olefin polymer having an external surface which is sealable and machinable, the layer containing a non-migratory particulate crosslinked hydrocarbyl-substituted polysiloxane. Particularly preferred particulate crosslinked hydrocarbyl-substituted polysiloxanes include the polymonoalkylsiloxanes. On the other side of the olefin polymer core layer there is an olefinic polymer layer having an external surface which is free of the non-migratory particulate crosslinked hydrocarbyl-substituted polysiloxane. The non-migratory slip agent does not, to any meaningful degree, effect film barrier properties or lamination bond strengths to other oriented polypropylene based films or polyester based films.

Even more specifically, the invention relates to a film structure comprising a first skin layer (a) of an olefin co- or ter-polymer having an external surface which is sealable and machinable on one side of a core olefinic polymer layer (b), the first skin layer containing a non-migratory particulate crosslinked hydrocarbyl-substituted polysiloxane, on an opposite side of the core layer there is a second skin layer (c) which includes an ethylene homopolymer which is free of the particulate crosslinked hydrocarbyl substituted polysiloxane of the first skin layer.

The invention further relates to a method of making a film comprising the step of coextruding a film structure, the film structure comprising a heat sealable layer (a) comprising an olefinic co- or terpolymer containing a particulate crosslinked hydrocarbyl-substituted polysiloxane; a core layer (b) comprising an olefinic polymer and an outer layer (c) comprising an ethylene homopolymer which is free of the particulate crosslinked hydrocarbyl-substituted polysiloxane of layer (a).

By improved machinability it is meant that the film exhibits a low coefficient of friction and has improved anti-slip and non-blocking characteristics.

DETAILED DESCRIPTION OF THE INVENTION

The film structure comprises an upper heat sealable layer comprising an olefinic copolymer or terpolymer having an external surface which is sealable and machinable, the layer containing, as slip agent, a particulate crosslinked hydrocarbyl-substituted polysiloxane, a core layer comprising an olefinic polymer, and a lower layer comprising an olefinic homopolymer.

A particularly preferred polymer employed as the core layer of the film herein is polypropylene, particularly highly isotactic polypropylene. The preferred polypropylenes are well known in the art. Typically, they are formed by polymerizing propylene in the presence a stereospecific catalyst system. They can have a melt index at 230° C. ranging from about 0.1–25. The crystalline melting point is usually about 160° C. The number average molecular weight typically ranges from about 25,000 to 100,000. The density typically ranges from about 0.90–0.91.

For descriptive purpose only, the film structures of the present invention will be described as having an upper skin layer (a), a core layer (b) and a lower skin layer (c). As may be appreciated by those skilled in the art, the use of the terms upper and lower to refer to particular skin layers is merely relative. Moreover, although referred to as skin layers, the upper and lower layers may have additional structures bonded thereto, based on the functional requirements of the overall structure.

The polymer materials which are contemplated for use in forming skin layer (a) are suitably exemplified by heat sealable polyolefinic copolymers and terpolymers and blends thereof. The copolymers are exemplified by and include block copolymers, for example of ethylene and propylene, random copolymers, for example of ethylene and propylene. The terpolymers are exemplified by ethylene-propylene-butene-1 terpolymers. Also, heat sealable blends can be utilized in providing layer (a). Thus, along with the copolymer or terpolymer there can be polypropylene homopolymer, e.g. one which is the same as, or different from, the polypropylene homopolymer constituting core layer (b) or other material which does not impair the heat sealability of this layer.

Suitable ethylene-propylene-butene-1 (EPB) terpolymers are those obtained from the random inter-polymerization of from about 1 to about 8 weight percent ethylene, preferably from about 3 to about 7 weight percent ethylene with from about 1 to about 10 weight percent butene-1, preferably from about 2 to about 8 weight percent butene-1 with propylene representing the balance. The foregoing EPB terpolymers are for the most part characterized by a melt index at 230° C. of from about 2 to about 16 and advantageously from about 3 to about 7, a crystalline melting point of from about 100° C. to about 140° C., an average molecular weight of from about 25,000 to about 100,000 and a density within the range of from about 0.89 to about 0.92 gm/cm$^3$.

The ethylene-propylene (EP) random copolymers generally contain from about 2 to about 8 weight percent ethylene, specifically about 3 to about 7 weight percent ethylene, the balance being made up of propylene. The copolymers can have a melt index at 230° C. generally ranging from about 2 to about 15 and preferably from about 3 to about 8. The crystalline melting point is usually from about 125° C. to about 150° C. and the number average molecular weight range is from about 25,000 to 100,000. The density will usually range from about 0.89 to about 0.92 gm/cm$^3$.

In general, when blends of EPB terpolymer and EP random copolymer are used, such blends will contain from about 10 to about 90 weight percent EPB terpolymer and preferably from about 40 to about 60 weight percent EPB terpolymer, the balance being made up of EP random copolymer.

Prior to extrusion, in accordance with the present invention, the heat seal layer (a) is compounded with an effective amount of a slip agent. Preferred non-migratory slip agents are selected from the group of particulate crosslinked hydrocarbyl-substituted polysiloxanes. Particularly preferred are the particulate crosslinked polymonoalkylsiloxanes. Most particularly preferred are non-meltable polymonoalkylsiloxanes characterized as having a mean particle diameter of about 0.5 to about 20.0$\mu$, typically determined by known scanning electron micrograph measurement techniques, and a three dimensional structure of siloxane linkages. Such materials are commercially available from Shin Etsu under various product designations and from Toshiba Silicone Co., Ltd., worldwide, and in the United States from General Electric Co., and are marketed under the tradename Tospearl. Particulate, spherical materials comprising acryl resins such as EPOSTAR manufactured by Nippon Shokubai Co., Ltd., are also contemplated. Other commercial sources of similar suitable materials are also known to exist. Especially preferred are the spherical particulates ranging in size from about 2 to about 5 $\mu$m. By non-migratory, it is meant that these particulates do not change location throughout the layers of the film in the manner of the migratory slip agents, e.g. polydialkylsiloxane or fatty amides. The amount employed typically ranges from about 0.1% to about 0.4% by weight, more specifically about 0.15% to about 0.3% by weight, based upon the entire weight of the skin layer resin.

Preferred for use in forming lower skin layer (c) are polymeric materials. Typical examples of such materials are those selected from the group consisting of ethylene polymers such as linear low density polyethylene (LLDPE), low density polyethylene (LDPE), medium density polyethylene (MDPE), high density polyethylene (HDPE) or blends thereof. Other contemplated resins include ethylene-vinyl alcohol copolymer (EVOH), ethylene-vinyl acetate copolymer (EVA) and polypropylene homopolymer. High density polyethylene is a particularly preferred polymeric material for forming this skin layer. In general, the density ranges from between about 0.94 to 0.96 gm/cm$^3$ and over. This skin layer is formed without adding the non-migratory particulate, which is included in the formulation of skin layer (a). Thus, skin layer (c) is considered to be free of the non-migratory particulate used in skin layer (a). This does not however, exclude the incidental presence of non-migratory particulate which might occur upon subsequent handling of the finished film, for example upon winding the film onto a roll, whereby non-migratory particulates from skin layer (a) might be sloughed onto the external surface of or imbedded into skin layer (c). In one embodiment of the invention the skin layer (c) consists essentially of high density polyethylene.

Either or both layers (a) and (c) can also contain pigments, fillers, stabilizers, light protective agents or other suitable modifying ingredients if desired. Further, skin layers (a) and/or (c) can optionally contain a minor amount of an additional antiblock material, such as, clays, talc, glass, and the like. These antiblock materials can be used alone, or different sizes and shapes can be blended to optimize machinability. The major proportion of these particles, for example, anywhere from more than half to as high as 90 weight percent or more, will be of such a size that a significant portion of their surface area, will extend beyond the exposed surface of such skin layer.

Core layer (b) can contain anti-static agents, e.g., cocoamine or N,N bis(2-hydroxyethyl) sterylamine. Suitable amines include mono-, di, or tertiary amines.

Core layer (b) will usually represent from about 70 to about 95 percent of the thickness of the overall film laminate or an even higher percentage thereof. Typically, upper skin layer (a) and lower skin layer (c) are coextensively applied to each major surface of core layer (b), usually by being coextruded directly thereon.

In any event, in forming the three layer structure layers (a), (b) and (c) can be coextruded from a conventional extruder through a flat sheet die, the melt streams being combined in an adapter prior to being extruded from the die. Each of the skin layers (a) and (c) can comprise, for example, approximately 6.0% of the total thickness of the laminate. After leaving the die orifice, the laminate structure is chilled and the quenched sheet is then heated and stretched, e.g., five to eight times in the machine direction (MD) and then subsequently, for example, eight to twelve times in the transverse direction (TD). The edges of the film can be trimmed. The film laminate is then, usually, wound on a reel.

As a result of the biaxial orientation of the film structure herein, several physical properties of the composite layers, such as: flex-crack resistance, Elmendorff tear strength, elongation, tensile strength, impact strength and cold strength properties are improved.

The overall thickness of the laminate is not critical and advantageously can range from about 5 microns to about 60 microns.

When an opaque label or film structure is desired, the core layer of the film structure of the present invention may be formed in accordance with U.S. Pat. No. 4,377,616.

Where opacifying agents are desired, they may be incorporated in the core composition of this invention, in a proportion of up to about 10%, preferably at least about 1%, by weight. Suitable conventional opacifying agents can be added to the melt mixture of the core polymer before extrusion thereof into a film. Opacifying compounds are generally well known in this area. They may be exemplified by iron oxides, carbon black, aluminum, aluminum oxide, titanium dioxide, and talc.

The processability and machinability of the film may be further enhanced by the inclusion of the polymeric material used to form one or both skin layers of a small percentage of finely subdivided inorganic material. Such inorganic material not only can impart antiblock characteristics to the multi-layer film structure of the present invention, but also can further reduce the coefficient of friction of the resultant film.

Contemplated finely divided inorganic materials, referred to above may be exemplified by: syloid, a synthetic amorphous silica gel, having a composition of about 99.7% $SiO_2$; diatomaceous earth having a composition of, for example, 92% $SiO_2$, 3,3% $Al_2O_3$, and 1.2% $Fe_2O_3$ which has an average particle size of about 5.5 microns, which particles are porous and irregularly shaped; dehydrated kaolinite (Kaopolite SF) having a composition of 55% $SiO_2$, 44% $Al_2O_3$, which has an average particle size of about 0.7 microns, and which particles are thin flat platelets; and synthetic, precipitated silicates, for example Sipernat 44, a material having a composition of 42% $SiO_2$, 36% $Al_2O_3$, and 22% $Na_2O$.

The polyolefin blends used to coextrude the multi-layer high opacity film structures contemplated herein are suitably formed by employing commercially available intensive mixers, such as those of the Bolling or Banbury type.

Typically the surface of skin layer (c) is treated by corona or flame treatment.

The resulting film has low water vapor transmission rate characteristics and low oxygen transmission rate characteristics. These improved physical properties make the film ideally suited for packaging food products, even those comprising liquids.

In one aspect of the invention, an important feature is the ratio of the thickness of the skin layer to the size of the particulate crosskinled hydrocarbyl-substituted polysiloxane and the thickness of the skin layer. The typical ratio, in terms of average particulate to skin thickness is from about 1.25 to about 2.5, specifically from about 1.5 to about 2.00. When the ratio of particulate to skin thickness is above about 2.5, the barrier properties of the film deteriorate. When the ratio is lower than about 1.5 machinability deteriorates.

EXAMPLES

The following specific examples demonstrate particular aspects of the present invention. Unless indicated to be on some other basis, all parts and percentages are by weight. Particulate sizes are reported by the manufacturers as being determined by measuring the diameter of the particles by scanning electron micrograph.

Coefficient of friction values referred to herein are determined according to the procedure of ASTM D 1894-78, using TMI equipment (without delay). Haze and gloss values referred to herein are determined according to the procedures of ASTM D 1003-61 and D 2457-70, respectively.

Minimum seal temperature is determined using a Wrap-Aide Crimp Sealer Model J or K. The crimped sealer is set to a dial pressure of about 20, dwell time of 0.75 seconds and starting temperature of about 93° C. A film specimen is prepared so that when two surfaces are placed together the resulting film is approximately 6.35 cm in the transverse direction by 7.62 cm in the machine direction. The specimen is then inserted squarely, smoothly and flatly into the crimp sealer jaws so that a small amount protrudes beyond the back end of the jaws. The transverse direction of the film is parallel to the sealer jaws.

The jaws are dosed and immediately after the sealing bar rises the specimen is removed from the jaws of the sealer. A JDC-type cutter is used to cut the film into a one inch strip. The amount of force needed to separate the seal is determined on an Alfred-Suter crimp seal strength testing unit. The amount of force needed to pull the seal apart is recorded in N/m. In order to determine the minimum temperature required to form a seal requiring about 77.03 N/m peel force, the crimp seals are formed at temperatures raised by 2.8 degree increments until one temperature yields a seal value of less than about 77.03 N/m and the next temperature yields a seal value of greater than or equal to about 77.03 N/m.

A chart method (using an established chart) for a 77.03 N/m minimum seal temperature (MST) is used or a calculation is used. However, in the examples, the chart method was used. In the calculation method the following equation is employed:

$$[\{(77.03\ N/m - V1)\_(V2 - V1)\} \times (2.8)] + T1 = MST\ \text{in}\ °C;$$

where

V1=seal value obtained prior to achieving 77.03 N/m

V2=seal value obtained subsequent to achieving 77.03 N/m 2.8=2.8 degree C. increment in seal temperature T1=temperature prior to achieving 77.03 N/m.

Examples 1–2

In these examples a coextruded biaxially oriented film structure is produced in which the first skin layer contains two different loadings of non-migratory slip agent in a ratio of particulate size in terms of mean particle diameter to skin thickness of about 1.6.

Example 1

A core layer of polypropylene (sold by Himont under the product designation PH-384) is coextruded with an ethylene-propylene copolymer sealant layer (sold by Fina under the product designation EOD-94-21) containing 1500 ppm of (0.15% by weight) non-migratory particulate crosslinked hydrocarbyl-substituted polysiloxane slip agent (sold by Shin Etsu under the product designation KMP-590). The average diameter of the particulates is about 2.5μ. On the other side of the core layer, a high density polyethylene skin layer (sold by Exxon under the product designation HXO353.67) is coextruded. The film is oriented 5 times in the machine direction and 8 times in the transverse direction. The final film has a thickness of about 17.78 microns. The seal skin layer thickness is about 1.25μ while the high density polyethylene skin thickness is about 0.5μ.

Example 2

A film identical to the film of Example 1 is produced except that the amount of non-migratory particulate crosslinked hydrocarbyl substituted polysiloxane is 3000 ppm (0.3% by weight). The performance of the films of Examples 1 and 2 is reported in Table 1.

TABLE 1

| Additive Loading (ppm) | Minimum Seal Temperature (°C.) | Coefficient of Friction (constant velocity) | % Haze | % Gloss |
|---|---|---|---|---|
| Example 1 1500 | 96.7 | 0.52 | 1.85 | 94.4 |
| Example 2 3000 | 98.3 | 0.46 | 2.55 | 90.5 |

Examples 3–4

In these examples two film samples are made as described in Example 1 except that the particulate is about 4–5μ average diameter (sold by Shin Etsu under the product designation X-52-1186). The ratio of particle size to skin thickness is from about 2.63 to about 3.29.

In Example 3 the particulate loading is 1500 (0.15 wt. %).

In Example 4 the particulate loading is 3000 (0.30 wt. %).

The performance of these films is reported in Table 2.

TABLE 2

| Additive Loading (ppm) | Minimum Seal Temperature (°C.) | Coefficient of Friction (constant velocity) | % Haze | % Gloss |
|---|---|---|---|---|
| Example 3 1500 | 98.9 | 0.43 | 1.85 | 91.3 |
| Example 4 3000 | 100.6 | 0.36 | 2.55 | 89.8 |

Examples 5–6

In these examples two films are prepared as described in Example 1 except that the seal layer is an ethyylene-propylene-butene-1 terpolymer. In Example 5, the seal layer contains 3000 ppm (0.3 wt. %) of the non-migratory particulate crosslinked hydrocarbyl-substituted polysiloxane having an average diameter of 2.5 F (sold by Shin Etsu under product designation KMP-590). As in Examples 1 to 2, the ratio of particle size to skin thickness is about 1.6. In Example 6, the seal layer contains 3000 ppm of similar non-migratory particulates having an average diameter of 4–5 F (sold by Shin Etsu under the product designation X-52-1186). As in Examples 3 to 4, the ratio of particle size to skin thickness is about 2.63 to about 3.29. The performance of the films is reported in Table 3.

TABLE 3

| Particulate Average Diameter (microns) | Minimum Seal Temperature (°C.) | Coefficient of Friction (constant velocity) | % Haze | % Gloss |
|---|---|---|---|---|
| Example 5 2.5 | 98.3 | 0.48 | 2.00 | 90.3 |
| Example 6 4–5 | 99.4 | 0.36 | 2.10 | 90.8 |

Examples 7–10

In these Examples a film similar to that described in Example 1 is produced except that a 4 micron average diameter non-migratory particulate crosslinked hydrocarbyl-substituted polysiloxane antiblock is added (sold by GE under the product designation Tospearl 145). The ratio of particle size to skin thickness is about 2.63.

In Example 7, 1500 ppm (0.15 wt. %) of Tospearl 145 is added to the copolymer sealant layer.

In Example 8, 3000 ppm (0.3 wt. %) of the Tospearl 145 is added to the copolymer sealant layer.

In Examples 9 and 10 the sealant layer is an ethylene-propylene-butene-1 terpolymer (sold by Montell under the product designation KT-225P). The Tospearl 145 is added to a loading of 1500 ppm (0.15 wt. %) in Example 9 and 3000 ppm (0.3 wt. %) in Example 10.

The performance of the films of these examples is reported in Table 4.

TABLE 4

| Example | Minimum Seal Temperature (°C.) | Coefficient of Friction (constant velocity) | % Haze | % Gloss |
|---|---|---|---|---|
| 7 | 102.2 | 0.44 | 1.40 | 92.1 |
| 8 | 102.2 | 0.37 | 1.70 | 91.2 |
| 9 | 99.4 | 0.40 | 1.45 | 92.3 |
| 10 | 99.4 | 0.32 | 1.75 | 91.8 |

It can be seen from the results reported in the foregoing examples that the film products of this invention demonstrate acceptable seal temperatures, excellent machinability, low haze and high gloss.

What is claimed is:

1. A film structure comprising a first outer skin layer (a) having an external surface which is sealable, comprising a propylene co- or terpolymer and a non-migratory particulate crosslinked hydrocarbyl substituted polysiloxane, on one side of a core olefinic polymer layer (b), and on an opposite side of the core layer (b), a second skin layer (c) which is free of the particulate crosslinked hydrocarbyl substituted polysiloxane of the first skin layer.

2. The film structure of claim 1 in which the particulate crosslinked hydrocarbyl-substituted polysiloxane of layer (a) is a crosslinked polymonoalkylsiloxane.

3. The film structure of claim 2 in which the particulate crosslinked non-meltable polymonoalkylsiloxane is characterized as having an average particle diameter of about 0.5 to about 20 microns.

4. The film structure of claim 1 in which the propylene co- or terpolymer of skin layer (a) is selected from the group consisting of ethylene-propylene copolymers and ethylene-propylene-butene-1 terpolymers.

5. The film structure of claim 4 in which the olefinic polymer of the core layer is polypropylene.

6. The film structure as described in claim 5 in which the ratio of particle size to thickness of the (a) skin layer ranges from about 1.25 to about 2.5.

* * * * *